US009904493B2

(12) United States Patent
Conley

(10) Patent No.: US 9,904,493 B2
(45) Date of Patent: Feb. 27, 2018

(54) AUTOMATIC ACCESS TO HIGH-LEVEL EXPLANATIONS OF SCHEDULING CONFLICTS IN PRINT ENGINE SCHEDULES

(71) Applicant: Xerox Corporation, Norwalk, CT (US)

(72) Inventor: John H. Conley, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 222 days.

(21) Appl. No.: 14/267,357

(22) Filed: May 1, 2014

(65) Prior Publication Data

US 2015/0317546 A1   Nov. 5, 2015

(51) Int. Cl.
*G06F 3/12* (2006.01)
*G06K 15/02* (2006.01)

(52) U.S. Cl.
CPC ............ *G06F 3/1215* (2013.01); *G06F 3/126* (2013.01); *G06F 3/1285* (2013.01); *G06K 15/1809* (2013.01); *G06F 3/1275* (2013.01)

(58) Field of Classification Search
CPC ......................... G06K 15/1856; G06F 3/1275
USPC ....................................................... 358/1.15
See application file for complete search history.

(56) References Cited

U.S. PATENT DOCUMENTS

| 4,920,499 | A | 4/1990 | Skeirik |
| 6,567,176 | B1 | 5/2003 | Jeyachandran et al. |
| 6,666,594 | B2 | 12/2003 | Parry |
| 7,180,619 | B2 | 2/2007 | Ferlitsch |
| 7,258,498 | B2* | 8/2007 | Hatta ................. H04N 1/00132 358/1.9 |
| 8,284,423 | B2 | 10/2012 | Jahn et al. |
| 8,554,089 | B2 | 10/2013 | Shifley et al. |
| 2005/0052659 | A1* | 3/2005 | Jacobsen et al. ............. 358/1.1 |
| 2005/0243365 | A1* | 11/2005 | Noda ........................... 358/1.15 |
| 2006/0028672 | A1* | 2/2006 | Abiko .......................... 358/1.14 |
| 2006/0044597 | A1* | 3/2006 | Dumitrescu et al. ........ 358/1.15 |
| 2012/0081740 | A1 | 4/2012 | Takagi et al. |
| 2013/0063774 | A1 | 3/2013 | Nuggehalli et al. |

OTHER PUBLICATIONS

Lampson et al., "Practical Use of a Polymorphic Applicative Language", Proceedings of the 10th ACM Symposium on Principles of Programming Languages, Austin, 1983, pp. 237-255.

* cited by examiner

*Primary Examiner* — Eric A Rust
(74) *Attorney, Agent, or Firm* — Gibb & Riley, LLC

(57) ABSTRACT

Methods and devices receive scheduling constraints for sheets of print media being processed as a print job through a printing device, and prepare a timing schedule for each of the sheets of print media based on the scheduling constraints. The timing schedule determines a location of each of the sheets of print media relative to the processing components of the printing device and relative to a linear time scale. Such methods and devices augment the timing schedule to produce an augmented timing schedule by adding explanatory text to the timing schedule, and receive user input selecting a portion of the augmented timing schedule. In response to the user input that selects a portion of the augmented timing schedule, the methods and devices output corresponding portions of the explanatory text that correspond to a location on the linear time scale represented by the selected portion of the augmented timing schedule.

17 Claims, 8 Drawing Sheets

AUTOMATIC ACCESS TO HIGH-LEVEL EXPLANATIONS OF SCHEDULING CONFLICTS IN PRINT ENGINE SCHEDULES

BACKGROUND

Systems and methods herein generally relate to scheduling items for print engines and more particularly to providing high-level explanations of scheduling conflicts in print engine schedules.

Modern printing systems provide various settings for complex flows of job submissions, print engine timing models, scheduling methods, etc. Such features greatly increase printing productivity.

However, some issues exist in the field or during system tests that are related to print engine productivity. For example, it can often be difficult to determine why print media sheets are not delivered at the correct time to various marking engine components (e.g., why a print engine skips a pitch). The answers depends on understanding complicated factors, such as the flow of job submission, the print engine timing model and scheduling method, etc.; and such answers, many times, are only known by highly trained programmers. In addition, a mismatch may exist between these models and the level of detail in the system logs' record of scheduled events. Many times, answering this question involves expert programmers creating a tedious, time-consuming map from the recorded data to find the decisions made by the scheduler and the print engine modules.

SUMMARY

Exemplary methods herein receive, into a computerized device, scheduling constraints for sheets of print media being processed as a print job through a printing device having processing components. These methods prepare a timing schedule for each of the sheets of print media based on the scheduling constraints, using the computerized device. The timing schedule determines the location of each of the sheets of print media relative to the processing components of the printing device and relative to a linear time scale (e.g., a linear scale having sequential increments in milliseconds or other regular counting units).

Such methods augment the timing schedule to produce an augmented timing schedule by adding explanatory text to the timing schedule using the computerized device. The explanatory text can comprise natural language prose describing a processing activity occurring at a point along the linear time scale and can, for example, describe an intended location of each of the sheets of print media with respect to the processing components of the printing device at different times along the linear time scale.

Then, these methods can output a bar graph (e.g., Gantt chart) corresponding to the linear time scale and receive user input selecting a portion of the bar graph. Therefore, such methods can receive, into the computerized device, user input selecting a portion of the augmented timing schedule (e.g., selection using a cursor of a graphical user interface selecting a portion of a Gantt chart of the timing schedule).

In response to the user input that selects a portion of the augmented timing schedule, the methods output, from the computerized device, corresponding portions of the explanatory text that correspond to a location on the linear time scale represented by the selected portion of the augmented timing schedule.

Such methods also can process the print job according to the augmented timing schedule using the printing device. If the print job fails, such methods can output corresponding portions of the explanatory text from the computerized device that correspond to a location on the linear time scale where the processing the print job failed.

Exemplary computerized devices herein include, among other components a processor and a printing device operatively (meaning directly or indirectly) connected to the processor. The processor receives scheduling constraints for sheets of print media being processed as a print job through the printing device using processing components of the printing device. The processor prepares a timing schedule for each of the sheets of print media based on the scheduling constraints. The timing schedule determines the location of each of the sheets of print media relative to the processing components of the printing device and relative to a linear time scale. The processor augments the timing schedule to produce an augmented timing schedule by adding explanatory text to the timing schedule using the processor. The processor receives user input selecting a portion of the augmented timing schedule and, in response, outputs corresponding portions of the explanatory text corresponding to a location on the linear time scale represented by the portion of the augmented timing schedule.

The processor can process the print job according to the augmented timing schedule using the printing device. Upon failure of the print job, the processor can output corresponding portions of the explanatory text from the computerized device based on the processing the print job failing. These corresponding portions of the explanatory text corresponding to a location on the linear time scale where the processing the print job failed.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
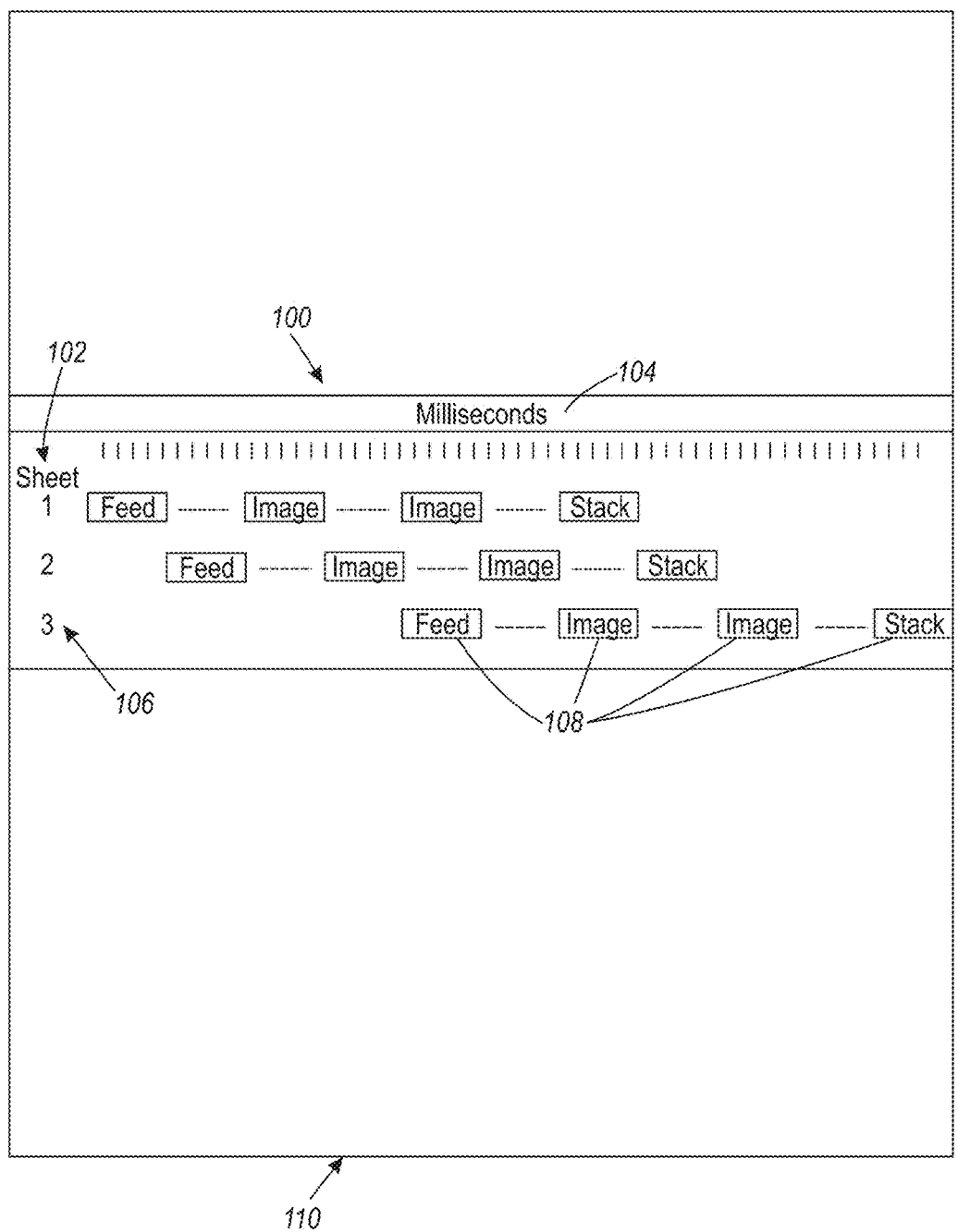
FIG. 1 is a schematic diagram illustrating a screenshot produced by methods and devices herein.

As noted above, it can often be difficult to determine why printing faults occur (such as why print media sheets are not delivered at the correct time to various marking engine components) without time-consuming investigation by expert programmers. Therefore, systems and methods herein generate explanations about why a particular sheet in a print engine job could not be delivered sooner to its destination, based on descriptive annotations of the print engine timing model.

The print engine scheduler is data-driven, and is based on software controls, such as the Scheduling Markup Language (SML). SML is used by machine module developers to describe an event model in terms of the module's timing and resource constraints. A sheet schedule is an instance of the model that satisfies these constraints. The constraints describe such events as when the sheet enters the module or when an image is placed on the sheet. Model parameters may be statically defined within SML text or set dynamically by the module when scheduling. The scheduler itself follows rules based on its method, for example "always deliver the next sheet as soon as possible."

The systems and methods herein augment SML with explanations such that whenever a constraint goes into effect when scheduling a sheet, an explanation instance is recorded and associated with the schedule by the programmer creating the schedule (using SML). For example, the programmer can manually create such explanations while creating the schedule within SML, or the programmer can choose previously created explanations that can be stored in a library while creating the schedule. The scheduler itself is able to be configured with explanations associated with its method rules. The explanations are intended to be easily understood by someone having a basic knowledge of how the print engine works, but who is not necessarily an expert in SML.

The augmented schedule produced by systems and methods herein can then be manipulated by means of a tool that allows the user to reschedule a sheet delivery into an available time slot. For example, in some systems and methods herein a sheet delivery is represented by a bar in a Gantt chart (e.g., see FIGS. 1-4, discussed below). With systems and methods herein the user is allowed to drag the bar into an unoccupied area of the chart, whereupon the tools provided by systems and methods herein display a text window showing the explanations leading to any constraints violated by the new schedule.

Example conflict explanations can include, for example, "sheet 7 must be delivered after sheet 6"; "sheet 7 spends 500 milliseconds entering the stacker at 12500"; "sheet 7 spends 500 milliseconds entering the marker at 5500"; "the letter size sheet runs in pitch mode 10 (frame size=500 milliseconds)"; "the back side image occupies the 3rd pitch after the photoreceptor seam at 11500"; "the front side image occurs 11 pitches earlier at 6000"; "*Conflict* sheet 6 back side image occurs at 6000"; "sheet 7 is sent to the modules at 3000"; "the stacker must receive the schedule no later than 4500"; "the marker must receive the schedule no later than 4500"; "the feeder must receive the schedule no later than 4000"; "sheet 7 is planned at 2700"; etc.

FIGS. 1-4 illustrate a graphical user interface 110 screen illustrating different screenshots. As shown in FIGS. 1-4, with systems and methods herein clicking on a bar in the Gnatt chart brings up a text window containing explanations; references to sheets in a text window could be hyperlinks to other explanation windows, affording navigation throughout a print job schedule.

Figure 2:
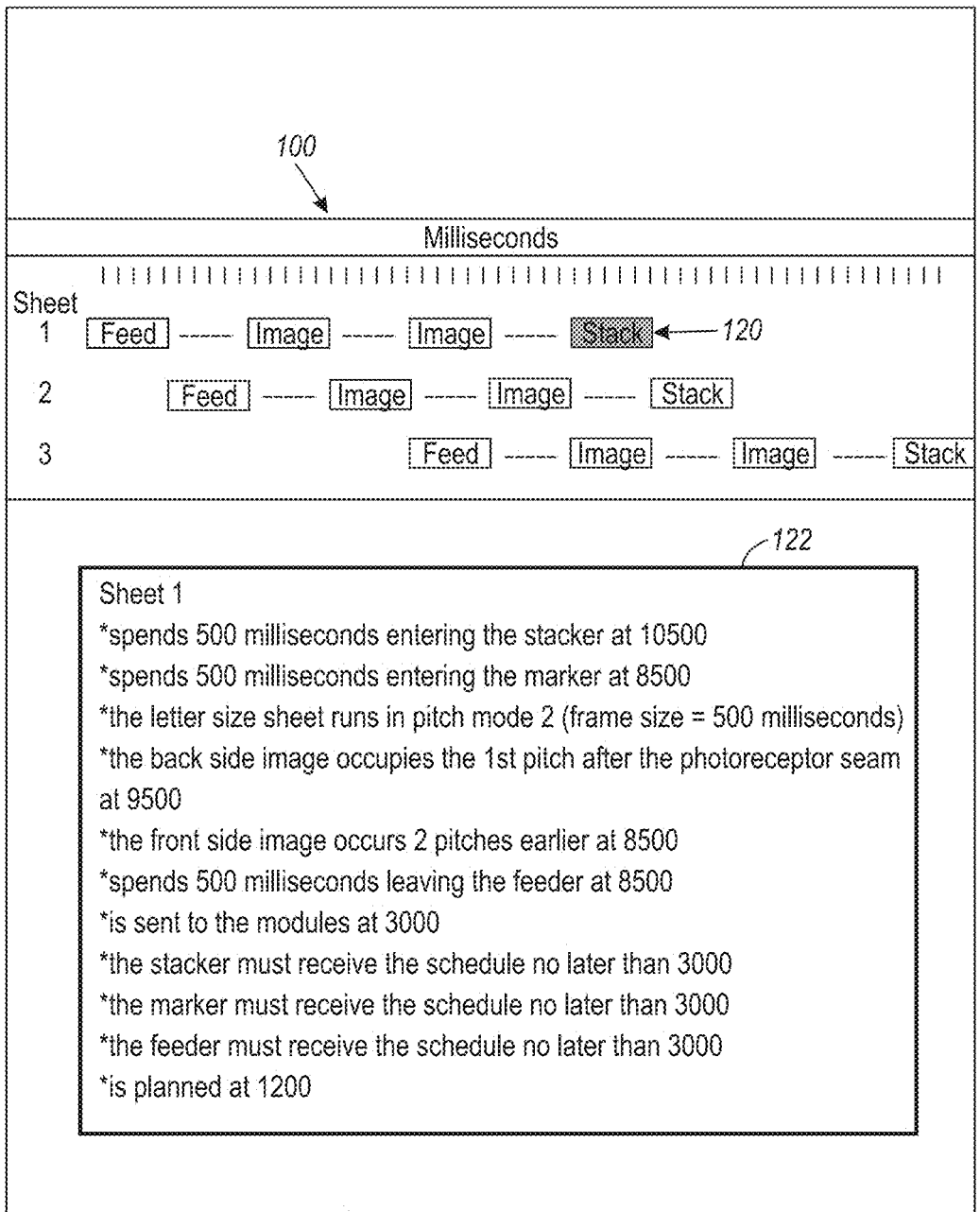
FIG. 2 is a schematic diagram illustrating a screenshot produced by methods and devices herein.
Figure 3:
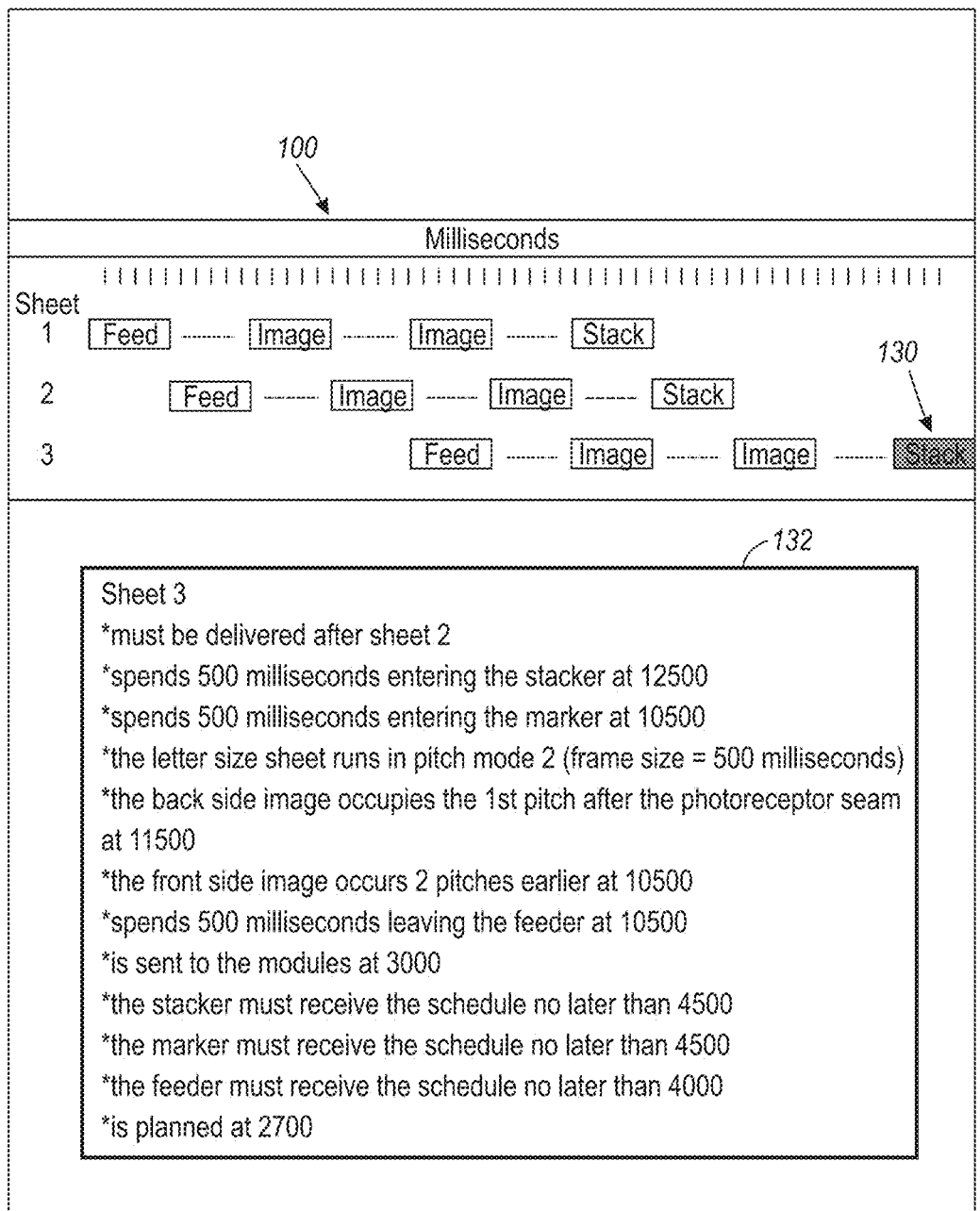
FIG. 3 is a schematic diagram illustrating a screenshot produced by methods and devices herein.
Figure 4:
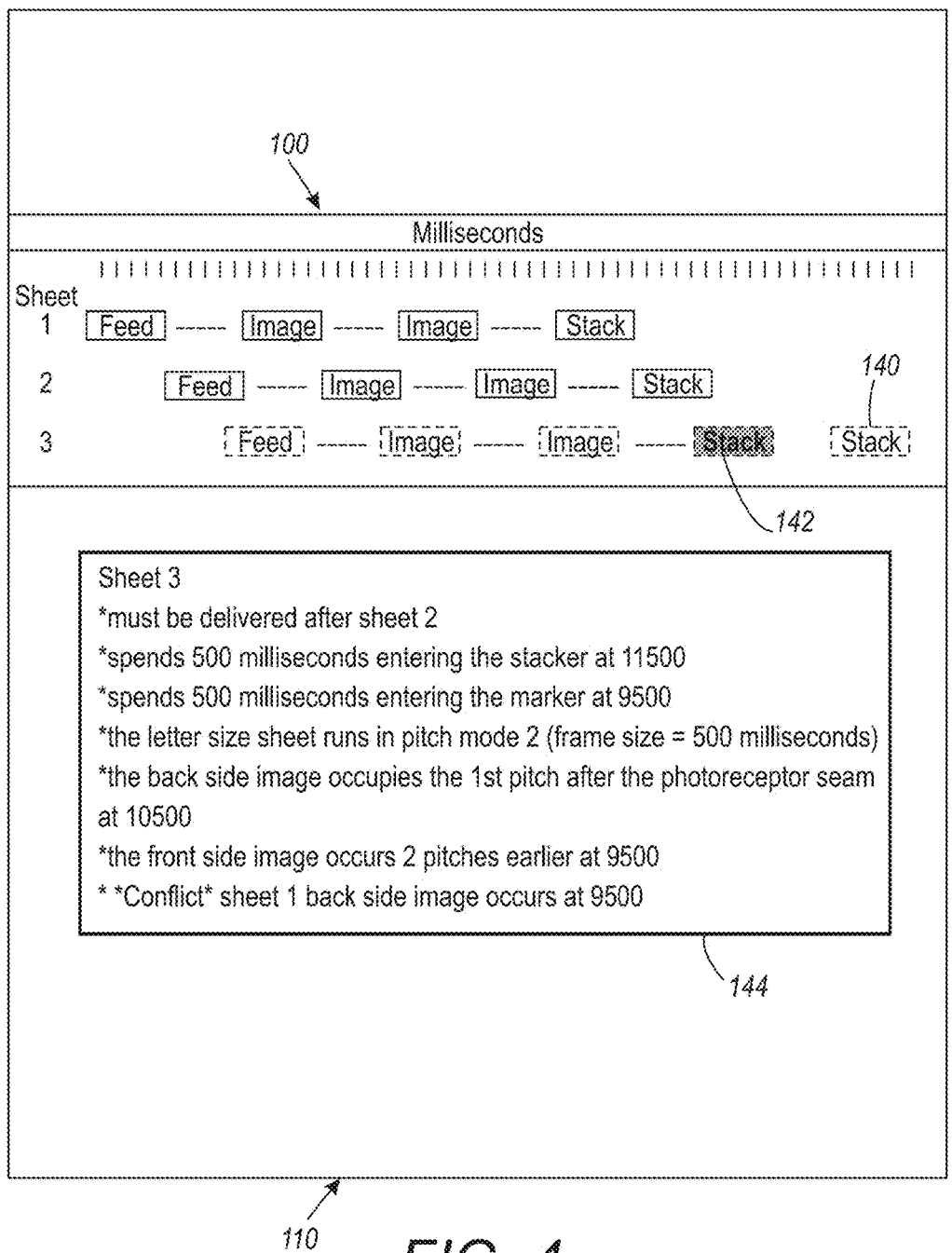
FIG. 4 is a schematic diagram illustrating a screenshot produced by methods and devices herein.

More specifically, as shown in FIG. 1, item 100 illustrates a Gantt chart depicting a series of sheet schedules (item 102) across a millisecond timeline which increases from left to right (item 104). Each horizontal entry, for example item 106 (Sheet #3), lays out a sheet schedule comprising successive printer operations applied to the Sheet#3 (item 108). In FIG. 2, item 120 represents the user's selection (through operation of a pointing device, such as a mouse, arrow keys, touch of a touch screen, etc.) of one sheet's operation item within the Gnatt chart 100 and the resulting pop-up display of explanations (item 122) for that operation item 120 within the Gnatt chart schedule 100. FIG. 3 shows the resulting display of explanations (item 132) for an operation item 130 within the schedule for a subsequent sheet. Note the delay between this sheet and its predecessor. FIG. 4 illustrates how, after the user attempts to move the delivery of the delayed sheet from the original time (item 140) to an earlier time (item 142), the explanations are updated to indicate the resulting scheduling conflict (item 144).

Figure 5:
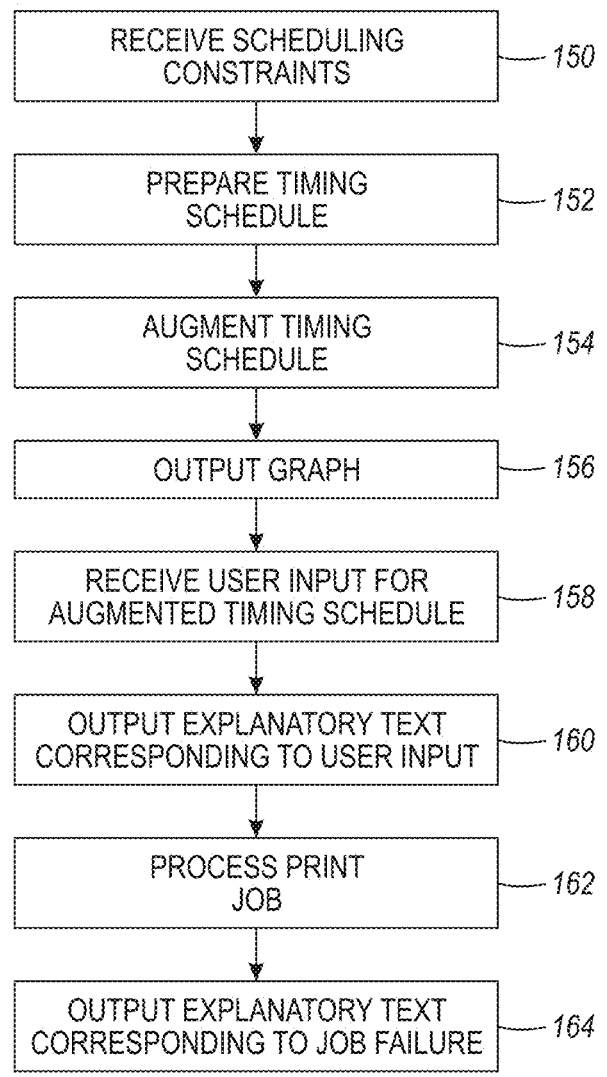
FIG. 5 is a flow diagram of various methods herein.

FIG. 5 is flowchart illustrating exemplary methods herein. In item 150, these methods receive, into a computerized device, scheduling constraints for sheets of print media being processed as a print job through a printing device having processing components. In item 152, these methods prepare a timing schedule for each of the sheets of print media based on the scheduling constraints, using the computerized device. The timing schedule prepared in item 152 determines the location of each of the sheets of print media relative to the processing components of the printing device and relative to a linear time scale (e.g., a linear scale having sequential increments in milliseconds or other regular counting units).

In item 154, such methods augment the timing schedule to produce an augmented timing schedule by adding explanatory text to the timing schedule using the computerized device. The explanatory text can comprise natural language prose describing a processing activity occurring at a point along the linear time scale and can, for example, describe an intended location of each of the sheets of print media with respect to the processing components of the printing device at different times along the linear time scale.

Then, in item 156, these methods can output a bar graph (e.g., Gantt or other similar time-based type chart) corresponding to the linear time scale and receive user input selecting a portion of the bar graph in item 158. Therefore, such methods can receive (into the computerized device in item 158) user input selecting a portion of the augmented timing schedule (e.g., selection using a cursor of a graphical user interface selecting a portion of a Gantt chart of the timing schedule).

In response to the user input that selects a portion of the augmented timing schedule in item 158, the methods output, from the computerized device in item 160, corresponding portions of the explanatory text (e.g., items 122, 132 and 144 in FIGS. 2-4) that correspond to a location on the linear time scale represented by the selected portion (e.g., items 120, 130 and 142 in FIGS. 2-4) of the augmented timing schedule.

Such methods also can process the print job according to the augmented timing schedule using the printing device in item 162. If the print job fails, such methods can output corresponding portions of the explanatory text from the computerized device that correspond to a location on the linear time scale where the processing the print job failed in item 164.

Figure 6:
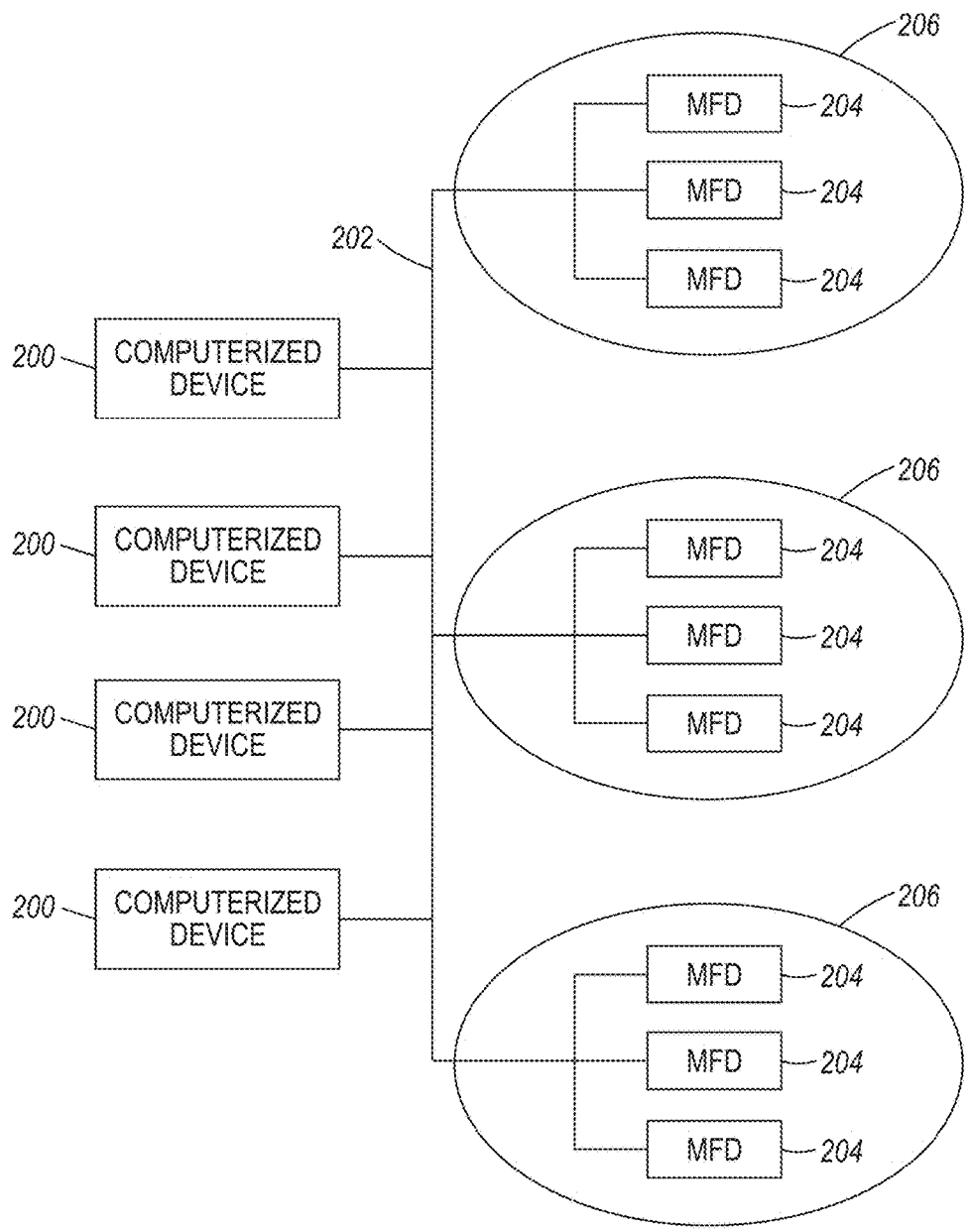
FIG. 6 is a schematic diagram illustrating systems herein.

As shown in FIG. 6, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 7:
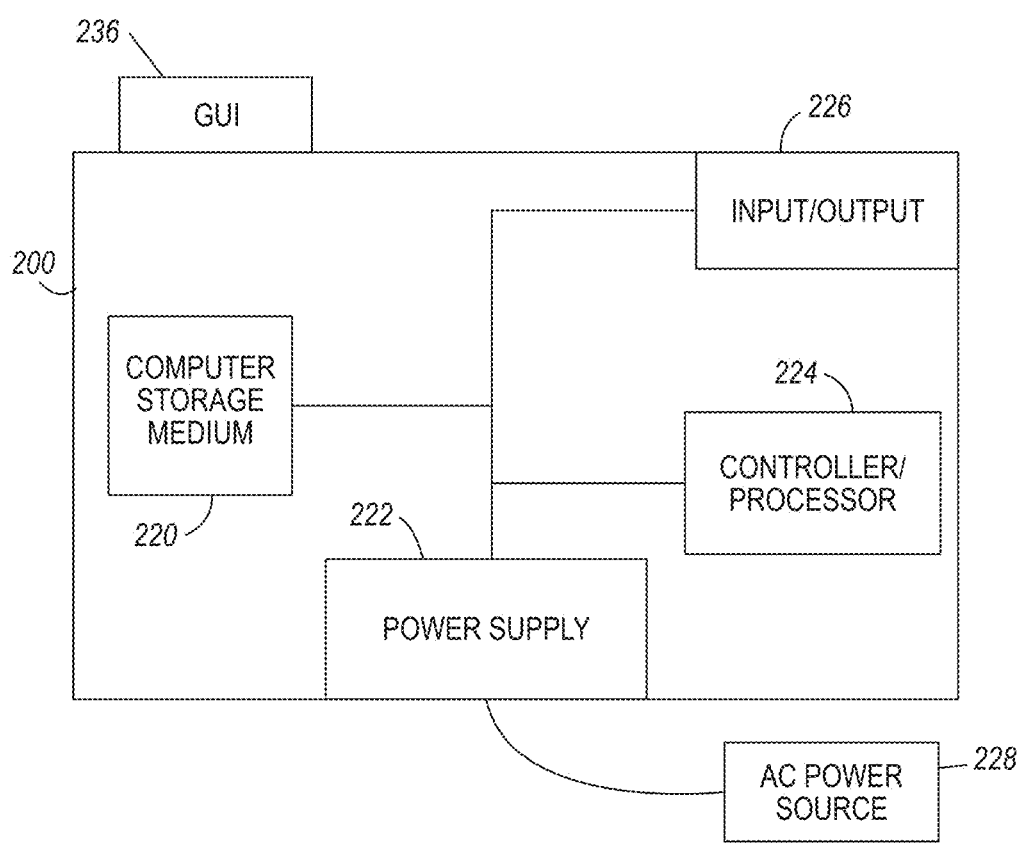
FIG. 7 is a schematic diagram illustrating devices herein.

FIG. 7 illustrates a computerized device 200, which can be used with systems and methods herein and can comprise, for example, a print server, a personal computer, a portable computing device, etc. The computerized device 200 includes a controller/tangible processor 224 and a communications port (input/output) 226 operatively connected to the tangible processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The tangible processor 224 controls the various actions of the computerized device. A non-transitory computer storage medium device 220 (which can be optical, magnetic, capacitor based, etc.) is readable by the tangible processor 224 and stores instructions that the tangible processor 224 executes to allow the computerized device to perform its various functions, such as those described herein. Thus, as shown in FIG. 3, a body housing has one or more functional components that operate on power supplied from an alternating current (AC) source 228 by the power supply 222. The power supply 222 can comprise a power storage element (e.g., a battery, etc).

Figure 8:
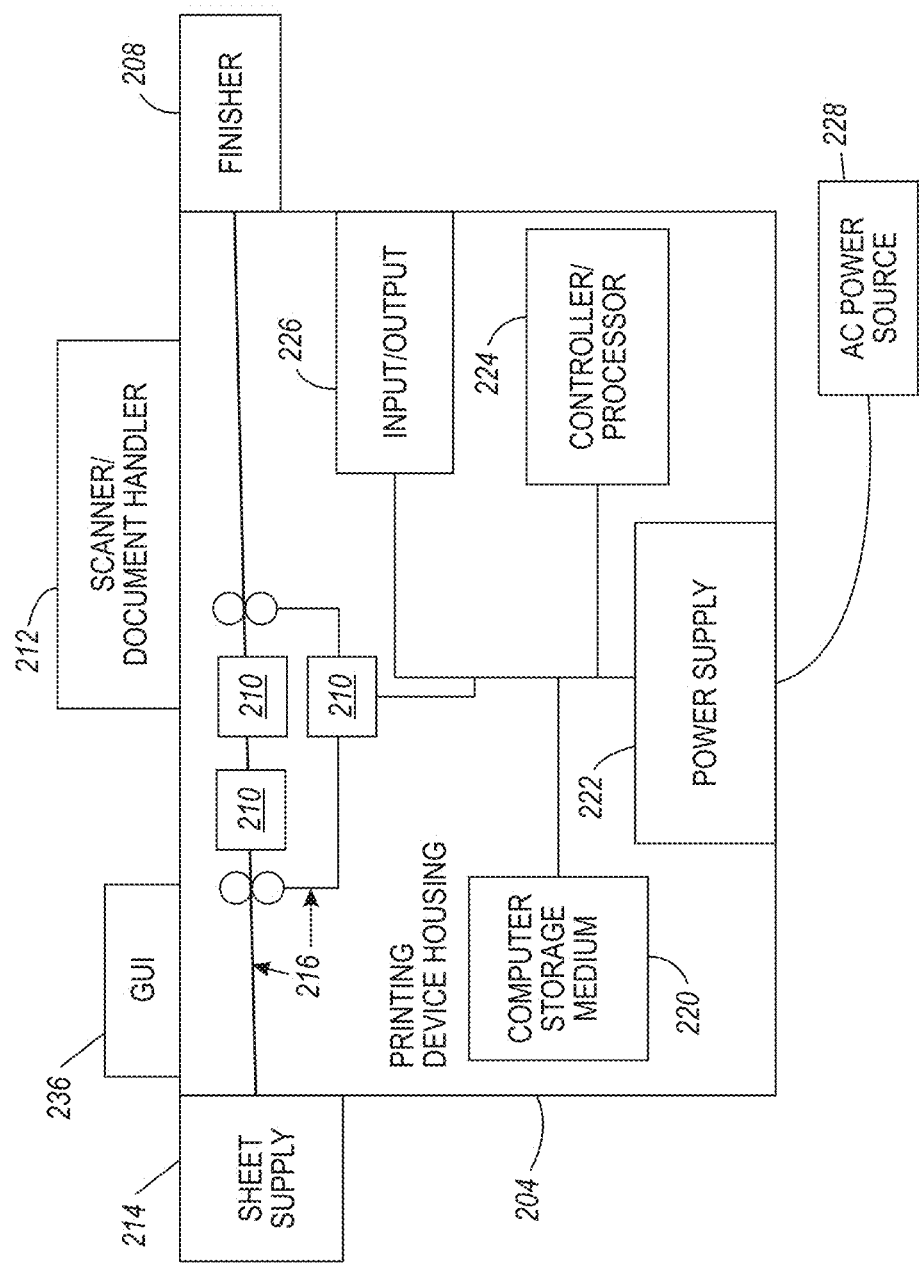
FIG. 8 is a schematic diagram illustrating devices herein.

FIG. 8 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the tangible processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operate on the power supplied from the external power source 228 (through the power supply 222).

Exemplary computerized devices herein include, among other components a processor 224 and a printing device 204 operatively (meaning directly or indirectly) connected to the processor 224. The processor 224 receives scheduling constraints for sheets of print media being processed as a print job through the printing device 204 using processing components of the printing device 204. The processor 224 prepares a timing schedule for each of the sheets of print media based on the scheduling constraints. The timing schedule determines the location of each of the sheets of print media relative to the processing components of the printing device 204 and relative to a linear time scale. The processor 224 augments the timing schedule to produce an augmented timing schedule by adding explanatory text to the timing schedule using the processor 224. The processor 224 receives user input selecting a portion of the augmented timing schedule and, in response, outputs corresponding portions of the explanatory text corresponding to a location on the linear time scale represented by the portion of the augmented timing schedule.

The processor 224 can process the print job according to the augmented timing schedule using the printing device 204. Upon failure of the print job, the processor 224 can output corresponding portions of the explanatory text from the computerized device based on the processing the print job failing. These corresponding portions of the explanatory text corresponding to a location on the linear time scale where the processing the print job failed.

As would be understood by those ordinarily skilled in the art, the printing device 204 shown in FIG. 8 is only one example and the systems and methods herein are equally applicable to other types of printing devices that may include fewer components or more components. For example, while a limited number of printing engines and paper paths are illustrated in FIG. 8, those ordinarily skilled in the art would understand that many more paper paths and additional printing engines could be included within any printing device used with systems and methods herein.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, book-making machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
receiving, into a computerized device, scheduling constraints for processing sheets of print media of one multi-sheet print job through a printing device having processing components;
preparing a sheet timing schedule for each of said sheets of print media of said multi-sheet print job based on said scheduling constraints, using said computerized device, said sheet timing schedule having different locations of different sheets of said multi-sheet print job relative to different ones of said processing components of said printing device and relative to a linear time scale to depict a series of sheet schedules along said linear time scale and show different successive printer operations applied to said different sheets of said multi-sheet print job at different times along said linear time scale;

augmenting said sheet timing schedule to produce an augmented sheet timing schedule by adding explanatory text to said sheet timing schedule using said computerized device, said explanatory text describing different intended locations of said different sheets of said multi-sheet print job with respect to different ones of said processing components of said printing device at different times along said linear time scale, and said explanatory text describing a different processing activity for said different sheets of said multi-sheet print job occurring at a corresponding point along said linear time scale;

receiving, into said computerized device, user input selecting a portion of said augmented sheet timing schedule; and outputting, from said computerized device in response to said user input selecting said portion of said augmented sheet timing schedule, corresponding portions of said explanatory text corresponding to a location on said linear time scale represented by said portion of said augmented sheet timing schedule.

2. The method according to claim 1, further comprising processing said multi-sheet print job according to said augmented sheet timing schedule using said printing device; and outputting corresponding portions of said explanatory text from said computerized device based on said processing said multi-sheet print job failing, said corresponding portions of said explanatory text corresponding to a location on said linear time scale where said processing said multi-sheet print job failed.

3. The method according to claim 1, said user input comprising selection using a cursor of a graphical user interface.

4. The method according to claim 1, said explanatory text comprising natural language prose.

5. The method according to claim 1, said outputting comprising outputting a Gantt chart of said sheet timing schedule.

6. The method according to claim 1, said linear time scale comprising sequential increments in milliseconds.

7. A method comprising:

receiving, into a computerized device, scheduling constraints for processing sheets of print media of a one multi-sheet print job through a printing device having processing components;

preparing a sheet timing schedule for each of said sheets of print media of said multi-sheet print job based on said scheduling constraints, using said computerized device, said sheet timing schedule having different locations of different sheets of said multi-sheet print job relative to different ones of said processing components of said printing device and relative to a linear time scale to depict a series of sheet schedules along said linear time scale and show different successive printer operations applied to said different sheets of said multi-sheet print job at different times along said linear time scale at different times along said linear time scale;

augmenting said sheet timing schedule to produce an augmented sheet timing schedule by adding explanatory text to said sheet timing schedule using said computerized device, said explanatory text describing an different intended locations of said different sheets of said multi-sheet print job with respect to different ones of said processing components of said printing device at different times along said linear time scale, and said explanatory text describing a different processing activity for said different sheets of said multi-sheet print job occurring at a corresponding point along said linear time scale;

outputting, from said computerized device, a bar graph corresponding to said linear time scale;

receiving, into said computerized device, user input selecting a portion of said bar graph; and outputting, from said computerized device in response to said user input selecting said portion of said bar graph, corresponding portions of said explanatory text corresponding to a location on said linear time scale represented by said portion of said bar graph.

8. The method according to claim 7, further comprising processing said multi-sheet print job according to said augmented sheet timing schedule using said printing device; and outputting corresponding portions of said explanatory text from said computerized device based on said processing said multi-sheet print job failing, said corresponding portions of said explanatory text corresponding to a location on said linear time scale where said processing said multi-sheet print job failed.

9. The method according to claim 7, said user input comprising selection using a cursor of a graphical user interface.

10. The method according to claim 7, said explanatory text comprising natural language prose.

11. The method according to claim 7, said outputting said bar graph comprising outputting a Gantt chart of said sheet timing schedule.

12. The method according to claim 7, said linear time scale comprising sequential increments in milliseconds.

13. A computerized device comprising:

a processor; and a printing device operatively connected to said processor, said printing device comprising processing components, said processor receiving scheduling constraints for processing sheets of print media of a one multi-sheet print job through said printing device using said processing components, said processor preparing a sheet timing schedule for each of said sheets of print media of said multi-sheet print job based on said scheduling constraints, said sheet timing schedule having different locations of different sheets of said multi-sheet print job relative to different ones of said processing components of said printing device and relative to a linear time scale to depict a series of sheet schedules along said linear time scale and show different successive printer operations applied to said different sheets of said multi-sheet print job, said processor augmenting said sheet timing schedule to produce an augmented sheet timing schedule by adding explanatory text to said sheet timing schedule, said explanatory text describing an different intended locations of different said sheets of said multi-sheet print job with respect to different ones of said processing components of said printing device at different times along said linear time scale, and said explanatory text describing a different processing activity for said different sheets of said multi-sheet print job occurring at a corresponding point along said linear time scale, said processor receiving user input selecting a portion of said augmented sheet timing schedule, and said processor outputting, in response to said user input selecting said portion of said augmented sheet timing schedule, corresponding portions of said explanatory text corresponding to a location on said linear time scale represented by said portion of said augmented sheet timing schedule.

14. The computerized device according to claim 13, said processor processing said multi-sheet print job according to said augmented sheet timing schedule using said printing device, said processor outputting corresponding portions of said explanatory text from said computerized device based on said processing said multi-sheet print job failing, and said corresponding portions of said explanatory text corresponding to a location on said linear time scale where said processing said multi-sheet print job failed.

15. The computerized device according to claim 13, said user input comprising selection using a cursor of a graphical user interface.

16. The computerized device according to claim 13, said explanatory text comprising natural language prose.

17. The computerized device according to claim 13, said outputting comprising outputting a Gantt chart of said sheet timing schedule.

* * * * *